US010691750B1

(12) United States Patent
Karppanen (10) Patent No.: US 10,691,750 B1
(45) Date of Patent: Jun. 23, 2020

(54) BROWSER CONFIGURED TO EFFICIENTLY STORE BROWSING SESSION STATE

(71) Applicant: Amazon Technologies, Inc., Seattle, WA (US)

(72) Inventor: Jari Juhani Karppanen, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 725 days.

(21) Appl. No.: 14/867,670

(22) Filed: Sep. 28, 2015

(51) Int. Cl.
| | |
|---|---|
| *G06F 3/00* | (2006.01) |
| *G06F 16/81* | (2019.01) |
| *G06F 3/0483* | (2013.01) |
| *G06F 3/0481* | (2013.01) |

(52) U.S. Cl.
CPC ........... *G06F 16/81* (2019.01); *G06F 3/0481* (2013.01); *G06F 3/0483* (2013.01); *G06F 3/04817* (2013.01)

(58) Field of Classification Search
CPC ... G06F 3/0481; G06F 3/0483; G06F 3/04817
See application file for complete search history.

(56) References Cited

U.S. PATENT DOCUMENTS

| | | | | |
|---|---|---|---|---|
| 4,468,751 A | * | 8/1984 | Plunkett, Jr. | G06F 17/21 360/55 |
| 6,460,060 B1 | * | 10/2002 | Maddalozzo, Jr. | G06F 16/9562 715/234 |
| 7,231,606 B2 | * | 6/2007 | Miller | H04L 43/50 702/186 |
| 7,512,932 B2 | | 3/2009 | Davidov et al. | |
| 7,617,458 B1 | * | 11/2009 | Wassom, Jr. | G06F 11/0709 715/760 |
| 7,627,814 B1 | | 12/2009 | Soldan et al. | |
| 8,510,237 B2 | | 8/2013 | Cascaval | |
| 8,555,157 B1 | | 10/2013 | Fu | |
| 8,677,097 B1 | * | 3/2014 | Nemazie | G06F 9/4411 711/103 |
| 8,762,878 B1 | * | 6/2014 | Weber | G06F 9/451 715/777 |
| 8,799,412 B2 | | 8/2014 | Trahan | |

(Continued)

OTHER PUBLICATIONS

Allen, M., HydrateJS by nanodeath, Dec. 14, 2013, http://nanodeath.gihub.io/HydrateJS/.

(Continued)

Primary Examiner — Tadesse Hailu
Assistant Examiner — Andrew Chung
(74) Attorney, Agent, or Firm — Knobbe, Martens, Olson & Bear, LLP (57) ABSTRACT

Features are disclosed for efficiently maintaining information regarding content navigation history and state of a browser application. The browser application can use a portion of a client device's non-persistent memory that has been assigned a direct byte-for-byte correlation with a file in persistent storage, such as a memory-mapped file. The browser application can access, store, and update information in the memory-mapped file in non-persistent memory without being responsible for ensuring that updates are also reflected in the file stored in persistent storage. The operating system of the client device can handle the tasks of writing to, and reading from, persistent storage.

21 Claims, 6 Drawing Sheets

(56) References Cited

U.S. PATENT DOCUMENTS

| | | |
|---|---|---|
| 9,167,054 B2 | 10/2015 | Trahan et al. |
| 9,201,850 B1* | 12/2015 | Buddhiraja ............. G06F 17/21 |
| 9,292,367 B2 | 3/2016 | Mickens |
| 9,383,932 B2 | 7/2016 | Das Sharma |
| 9,509,783 B1 | 11/2016 | Hayden |
| 9,749,202 B1 | 8/2017 | Jain et al. |
| 9,881,096 B1* | 1/2018 | Warr ................. G06F 17/30873 |
| 2001/0043800 A1* | 11/2001 | Gotoh ............. G11B 20/10527 386/329 |
| 2002/0133627 A1 | 9/2002 | Maes |
| 2002/0147788 A1 | 10/2002 | Nguyen |
| 2004/0015476 A1 | 1/2004 | Twaddle |
| 2004/0230903 A1 | 11/2004 | Elza et al. |
| 2005/0198365 A1 | 9/2005 | Wei |
| 2006/0010150 A1* | 1/2006 | Shaath ................... G06F 16/125 |
| 2006/0136552 A1 | 6/2006 | Krane et al. |
| 2006/0282795 A1* | 12/2006 | Clark ..................... G06Q 10/10 715/840 |
| 2008/0005686 A1* | 1/2008 | Singh .................... G06F 3/0483 715/764 |
| 2008/0139191 A1 | 6/2008 | Melnyk |
| 2008/0313206 A1 | 12/2008 | Kordun et al. |
| 2009/0168760 A1 | 7/2009 | Katis et al. |
| 2009/0210631 A1 | 8/2009 | Bosworth et al. |
| 2009/0287559 A1* | 11/2009 | Chen .................. G06Q 30/0222 705/14.23 |
| 2010/0005053 A1 | 1/2010 | Estes |
| 2010/0070928 A1* | 3/2010 | Goodger ........... G06F 17/30905 715/838 |
| 2010/0082747 A1* | 4/2010 | Yue ....................... G06F 16/954 709/204 |
| 2010/0161587 A1* | 6/2010 | Sullivan ............ G06F 17/30884 707/709 |
| 2010/0180225 A1* | 7/2010 | Chiba .................... G06F 3/0481 715/777 |
| 2010/0313065 A1* | 12/2010 | Feeley ................. G06F 12/0246 714/6.12 |
| 2010/0313189 A1 | 12/2010 | Beretta et al. |
| 2011/0015917 A1 | 1/2011 | Wang et al. |
| 2011/0082996 A1* | 4/2011 | Wester .............. G06F 17/30377 711/170 |
| 2011/0145360 A1 | 6/2011 | Sheshagiri et al. |
| 2011/0176790 A1* | 7/2011 | Morris .............. H04N 21/43615 386/299 |
| 2011/0191677 A1* | 8/2011 | Morris ...................... G06F 3/00 715/716 |
| 2011/0225495 A1* | 9/2011 | Casalaina ......... G06F 17/30528 715/716 |
| 2011/0258532 A1 | 10/2011 | Ceze et al. |
| 2012/0066380 A1 | 3/2012 | Gao et al. |
| 2012/0131485 A1* | 5/2012 | Svendsen .............. G06F 3/0483 715/769 |
| 2012/0173966 A1 | 7/2012 | Powell et al. |
| 2012/0260157 A1 | 10/2012 | Zhu et al. |
| 2012/0330984 A1 | 12/2012 | Fablet et al. |
| 2012/0331228 A1 | 12/2012 | Shatz |
| 2012/0331406 A1* | 12/2012 | Baird ...................... H04L 67/02 715/760 |
| 2013/0007100 A1 | 1/2013 | Trahan |
| 2013/0031459 A1 | 1/2013 | Khorashadi et al. |
| 2013/0185650 A1* | 7/2013 | Gutowitz ................ G06F 3/017 715/752 |
| 2013/0205244 A1* | 8/2013 | Decker .................... G06F 17/21 715/777 |
| 2013/0246906 A1 | 9/2013 | Hamon |
| 2014/0026096 A1* | 1/2014 | Zhang .................... G06F 3/0485 715/784 |
| 2014/0033019 A1 | 1/2014 | Zhang |
| 2014/0053064 A1 | 2/2014 | Weber et al. |
| 2014/0126309 A1* | 5/2014 | Kelly ..................... G11C 19/28 365/189.12 |
| 2014/0164960 A1* | 6/2014 | Kuo .................. G06F 17/30899 715/760 |
| 2014/0215336 A1* | 7/2014 | Gardenfors ............. G06F 3/017 715/719 |
| 2014/0310608 A1* | 10/2014 | Snyder ................ G06F 3/04842 715/738 |
| 2015/0026566 A1 | 1/2015 | Hui |
| 2015/0089352 A1 | 3/2015 | Conboy et al. |
| 2015/0205462 A1* | 7/2015 | Jitkoff ................... G06F 3/0483 715/777 |
| 2015/0269065 A1* | 9/2015 | Bourd ....................... G06F 9/54 711/155 |
| 2015/0271188 A1 | 9/2015 | Call |
| 2015/0279463 A1* | 10/2015 | Berke ...................... G11C 5/04 711/105 |
| 2016/0057220 A1 | 2/2016 | Gibbs et al. |
| 2016/0299764 A1* | 10/2016 | Chakra ..................... G06F 9/44 |
| 2016/0313896 A1* | 10/2016 | Liang .................. G06F 3/04842 |
| 2017/0329554 A1* | 11/2017 | Voigt .................... G06F 3/0647 |
| 2018/0004856 A1* | 1/2018 | Levi ...................... G06F 3/0482 |

OTHER PUBLICATIONS

Gross, R., and A. Wightman, MarioNet Split Web Browser, p. 1, Jan. 1999, https://en.wikipedia.org/wiki/MarioNet_split_web_browser.

Garsiel, T., and P. Irish, How Browsers Work: Behind the Scenes of Modern Web Browsers, http:www.html5rocks.com/en/tutorials/internals/howbrowserswork/, published Aug. 5, 2011, pp. 1-62, retrieved Jun. 25, 2015.

Hickson, I., Ed., Web Storage, W3C Working Draft, Oct. 29, 2009, pp. 11-18, http://www.w3.org/TR/2009/WD-webstorage-20091029/.

Jain, A.S., and D.L.R. Batni, Remote Session Preview Management, U.S. Appl. No. 14/180,245, filed Feb. 13, 2014.

Jquery API Documentation, Feb. 10, 2010, Version 1.2, p. 162, http://api.jquery.com/serialize/.

Wellons, C., Precise JavaScript Serialization With ResurrectJS, Mar. 28, 2013, http://nullprogram.com/blog/2013/03/28/.

\* cited by examiner

BROWSER CONFIGURED TO EFFICIENTLY STORE BROWSING SESSION STATE

BACKGROUND

Generally described, computing devices and communication networks can be utilized to exchange information. In a common application, a computing device can request content from another computing device via a communication network. For example, a user at a personal computing device can utilize a software application process, typically referred to as a browser application or "browser," to request content from a server computing device via the Internet. In such embodiments, the personal computing device can be referred to as a client device or user device, and the server computing device can be referred to as a content provider or content source.

Once a client device obtains content, such as a web page or other network-accessible content item, the content may be processed in a number of stages by the browser. For example, the browser may parse a Hypertext Markup Language ("HTML") web page to extract layout information and references to associated resources; request and receive associated resources such as Cascading Style Sheets ("CSS") and JavaScript code files; construct a document object model ("DOM") to represent the various components of the web page and manage their associated properties; etc.

Browsers typically allow multiple content items to be open concurrently. For example, users can open multiple browser windows, such as multiple separate browser instances or multiple tabbed display windows ("tabs") within a single browser instance. Each separate window displays a different content item, and may be used to navigate to various other content items. The browser stores information about the history of accessed content items and navigation paths in each window such that users can return to previously accessed pages in a given window (e.g., by clicking a "back" button) without affecting the content item currently displayed in a different browser window. Saving the history can require writing and managing updates to a large amount of data, such as when there are long navigation paths in multiple windows, a large number of windows open concurrently, etc. Many browsers incur the overhead required to use relational database engines in order to manage the storage of history data.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to efficiently maintaining information regarding content navigation history in a browser application. More specifically, aspects of the present disclosure are directed to storing information related to a browser application in a non-persistent memory location that has been correlated with a file in persistent storage. As the browser application generates and stores information related to execution of the browser application in the non-persistent memory location, the information is also stored in the correlated persistent storage location. In this way, the browser application can be sure that navigation history information will be stored to persistent storage, even in the event of a runtime anomaly such as a browser crash. In addition, navigation history information can be stored and updated without the overhead of using a relational database management engine.

Although aspects of the embodiments described in the disclosure will focus, for the purpose of illustration, on the use of a memory-mapped file in non-persistent memory that corresponds to a file in persistent storage, one skilled in the relevant art will appreciate that the examples are illustrative only and are not intended to be limiting. In some embodiments, the memory-mapped file may be mapped to a network-based resource instead of, or in addition to, file that is physically present on-disk. For example, the memory mapped-file may be mapped to a network communication port, shared memory object, or some other storage or communication resource.

In addition, although aspects of the embodiments described in the disclosure will focus on the storage and maintenance of navigation history by a browser application, one skilled in the relevant art will appreciate that the examples are illustrative only, and are not intended to be limiting. For example, information regarding user preferences, browser settings, and the like may be stored instead of, or in addition to, navigation history. Navigation history and other information stored using the systems and methods described herein may be collectively referred to as browser state information. Various aspects of the disclosure will now be described with regard to certain examples and embodiments, which are intended to illustrate but not limit the disclosure.

With reference to an illustrative embodiment, a user may cause a client device to load and execute an instance of a browser application, also referred to simply as a "browser," for accessing content provided by one or more content providers. The browser may be instantiated by loading executable instructions and other data from persistent storage into non-persistent memory. For example, the client device may load executable instructions from a hard disk drive or flash drive into random access memory ("RAM"). Persistent storage may also be referred to as non-volatile storage, and non-persistent memory may also be referred to as volatile memory or primary memory.

Subsequent to the browser being loaded, a user or automated browser process may cause the client device to transmit a request to access content from a content provider.

The request may include information identifying one or more sources for the requested content, such as a uniform resource locator ("URL") or other address of a network resource. For example, the user may select or enter a URL (e.g., "http://" followed by a domain name, top level domain, and file name, illustratively "xyzwebsite.com/default.htm") into a browser window, causing the client computing device to transmit a request for the file to the content provider associated with the domain in the selected URL.

The browser may receive content from the content provider in response to the request. The content may include a base network resource, such as an HTML file defining a web page, and one or more secondary or embedded resources, such as images video, audio, text, executable code, and the like. The browser may include a layout engine or rendering engine that parses the received content to identify and process various elements, such as HTML layout information, CSS information, embedded objects such as images or video, or script content such as JavaScript or other source code. The rendering engine may prepare a visual representation of the network resource for display in a window of the browser.

The user can interact with the resource by scrolling, panning, tapping, clicking, typing, and/or performing various other actions. Some actions may initiate a request for another network resource. For example, the displayed representation of the network resource may include one or more links to other network resources. Alternatively, a user may enter a URL for another network resource. In response to a user activating a link, entering a URL, or otherwise navigating to a new network resource, the browser may request, receive, process, and display the new network resource as described above.

The browser application can store information about the navigation history of the current browsing session (or many browsing sessions) or other information about the state of the browser in the context of the current browsing session (or many browsing sessions). Examples of a browsing session include: retrieval of one or more network resources by the browsing application during a predetermined or dynamically determined period of time; retrieval of one or more network resources subsequent to instantiation of a browser application instance and prior to at least one of termination of the browser application instance or occurrence of a time out event; a period of time including at least a threshold amount of user interactivity with a browser application instance; etc. Examples of information regarding the state of the browser application include URLs of requested resources, thumbnail images of displayed resources, resource icons ("favicons") for received resources, scroll position coordinates, information about other user actions with the resources, processing optimization hints such as the location of an element on a display of a network resource, communication headers, cookies, performance metrics, addresses or other identifiers of particular proxies or other intermediaries used by the client device, etc. Illustratively, browser state information may be used to allow a user to easily return to previously-requested content using a "back" button or some other alternative to entering or re-entering the URL of the desired network resource. In addition, the browser state information allows the browser to maintain the state of the current browsing session after a runtime anomaly, such as a browser crash. When the browser is reloaded or otherwise instantiated after such an anomaly, the stored browser state information may be accessed to determine, e.g., which resources should be automatically requested to restore the browsing session without requiring the user to manually recreate the browsing session.

Saving the navigation history and other browser state information can require the storage and maintenance of a large amount of data, particularly when many pages or other resources have been requested during a browsing session or when many different pages/resources are concurrently accessed by a single instance of a browser application or multiple instances of a browser application. The browser can save browser state information by generating, and causing the client device to execute, a command or set of commands to write data to a storage location. Browser state information is typically saved on a regular basis to avoid losing state if the browser crashes. Using a relational database to manage the writing and storing of browser state information incurs a large amount of overhead due to the necessity of loading and executing the database engine and reading (or keeping cached) the various metadata structures used in normal relational database operation. In contrast, the systems and methods described herein involve the browser writing to, and reading from, a memory-mapped file, while the operating system of the client device manages the persistent storage of the information in the memory-mapped file without the overhead of a database engine.

Illustratively, if there are changes to browser state (e.g., a new web page or other resource is requested), a new record may be created and stored in the memory-mapped file. The record may include or be associated with one or more unique identifiers, such as identifiers for the browser window, the resource to which the record applies, the current user, the client device, etc. The values of some or all of the identifiers can be assigned in increasing order over the course of the browsing session (or multiple browsing sessions). This allows chronological sorting of the records regardless of the order the records are written into the file or later read from the file.

Sorting browser state records may be necessary when, e.g., the records for all tabs and all resources are written to a single file. In such cases, the records for a single tab or resource may appear non-sequentially within the file depending upon the order in which they were written, the space available at the time they were written, etc. For example, a memory-mapped browser state file may have a fixed, predetermined size, and may therefore store a finite number of records and may have a limited amount of space available for new records. A tab or other browser window may be closed, and its records may no longer be needed. In some embodiments, records associated with closed browser tabs or other windows can be abandoned to free up space for new records. Rather than erasing all of the abandoned records and re-arranging the remaining records in the file to aggregate the empty space at the end of the file, the browser may simply mark the space used by the abandoned records as "available." The browser may later use any available space, including the space used by the abandoned records, for writing new records. Illustratively, the browser may use available space located between current, valid records when there is no available space at the end of the file. Thus, the records for individual tabs/or resources may appear in non-chronological order within the file, and a method for determining the proper chronological order may be needed.

As described in greater detail below, in one embodiment, one or more identifiers may be utilized to track or associate order to resource requests. Illustratively, each tab or other browser window may be assigned a different incremental identifier depending upon the order in which the windows were instantiated. Each requested resource may be assigned a different incremental identifier depending upon the order in which the resources were requested. By storing each record with an incremental tab identifier and incremental resource identifier, records can be identified according to specific tab and requested resource, even though all records from all tabs may be stored in non-chronological order a single file. In addition, by storing each record with an incremental identifier for the network resource associated with the event described in the record, the browser can know the order of events (or other browser state change events) that occurred for individual resources or tabs.

After writing a browser state record to the memory-mapped file, the browser can write an availability record, also referred to as a "padding" record, that indicates the amount of available space present after the record and before the next record or the end of the file. Thus, the browser can later easily determine the sizes of the spaces in the memory-mapped file that are available for new records. In addition, the browser can maintain a list of the n largest contiguous regions of available space (where n is a positive integer), such as regions containing only empty space or abandoned records associated with closed tabs. In this way, the browser can quickly determine a location into which records can be written. For example, a new network resource may have been requested, and the browser may typically store about 10 records for each requested network resource. The browser can inspect the list of contiguous available regions to identify a region large enough to store some or all records expected to be generated in connection with the requested network resource. The browser can then write a record for the new resource request into the determined region. Later, the browser can add additional records, related to the requested resource, immediately after the initial record for the new resource request in the memory-mapped file. As a result, the browser may store more-recently created records closer to the beginning of the file than certain less-recently created records. In addition, when writing records to the memory-mapped file, the browser may choose one or more regions such that the minimum number of memory pages is affected.

The browser can write records to the memory mapped file in non-persistent memory without generating or executing a command or other instruction that causes updates to be written to the corresponding file maintained in persistent storage. Once a record has been stored in non-persistent storage, one or more operating system functions can automatically cause the record to be replicated to persistent storage without having the browser invoke the operation system functions. For example, the operating system may automatically write, to persistent storage, the records most recently added to the memory-mapped file in order to minimize the risk of losing the records for the current browser state if any runtime anomaly or other browser application termination occurs (e.g., browser application crash, client device unplugged or battery is drained, the client device dropped on the floor, etc.).

When restoring browser state using a memory-mapped file, the browser may load abandoned records, such as records associated with a closed tab or records that have been replaced by newer records (e.g., records, with out-of-date information, that have been superseded by newer records). Using tab identifiers, resource identifiers, and record type codes, the browser may sort the records after reading, or the browser may insert the records in the correct chronological order during reading. In this way, the browser can ensure that the resulting restored browser state is based on the most recent available records. For example, there may be navigation history records for a closed tab, and a final record that indicates the tab was closed and the history is to be abandoned. Longer sequences of such records may be treated as free region, with individual records simply being available "holes" in the memory-mapped file. As another example, a "back" navigation event followed by a request for a new URL can lead to the previous "tip" of the navigation history being abandoned. Chronologically subsequent records for the navigation history may be stored in the file at a location preceding the records for the abandoned tip of the navigation history. If the records were not able to be sorted chronologically, the browser may incorrectly load the browser state with the abandoned tip intact. However, because the records can be sorted chronologically using the identifiers, the order in which the records appear in the file does not matter.

Figure 1:
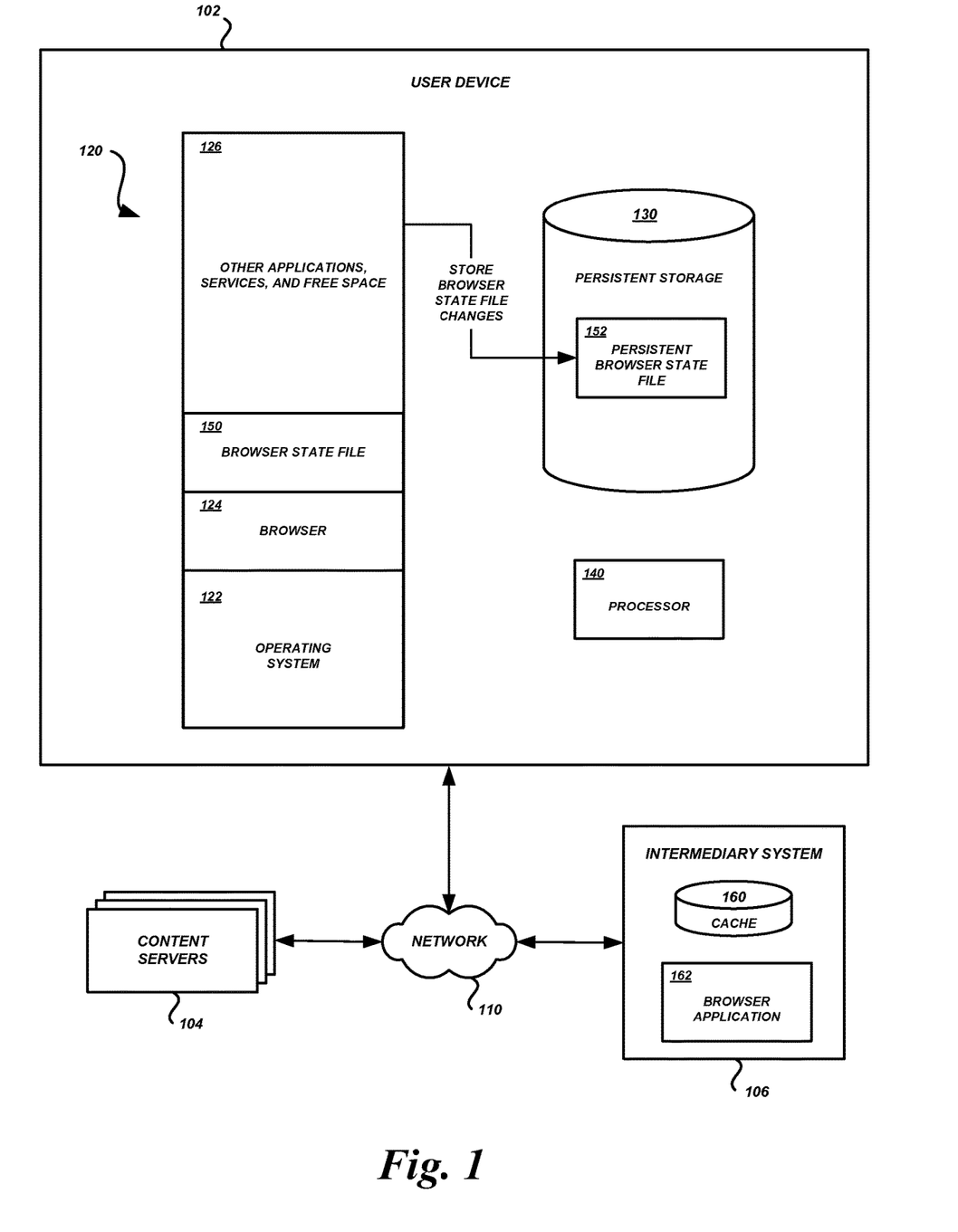
FIG. 1 is a block diagram of an illustrative client device with a memory-mapped file for storage of browser state information according to some embodiments.

FIG. 1 illustrates an example network environment in which features can be implemented for storing browser state information such that the browser state can be restored at a later time. The network environment shown in FIG. 1 includes a client device 102, various content servers 104, such as origin content servers and content delivery network ("CDN") servers, and an intermediary system 106, such as a proxy server or network computing provider. The devices may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The client device 102 may be any one of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

In some embodiments, as shown, the client device 102 has a non-persistent memory 120 (also referred to herein as non-transitory non-persistent memory, primary memory, or volatile storage), persistent storage 130 (as referred to herein as non-transitory persistent storage, or non-volatile storage), and one or more hardware processors 140 (e.g., central processing units or "CPUs'), among other components. As used herein the term "non-transitory," when used with respect to persistent storage or non-persistent memory, refers to the property of not being transitory (e.g., not being of brief duration). The term "non-transitory" is not meant to imply absolute permanence or infinite persistence. For example, RAM is an example of non-transitory non-persistent memory, and hard disk drives and flash drives are examples of non-transitory persistent storage. Although each of these examples is capable of storing information for less than an infinite amount of time, they are not to be considered transitory.

The non-persistent memory 120 may store data and instructions used by the processor 140 to perform various computing tasks. For example, the non-persistent memory 120 may include an operating system 122, a browser application 124, and various applications, services, or free space 126. In addition, the non-persistent memory 120 may store data associated with the browser application, such as a memory-mapped browser state file 150, as described in greater detail below. The data and instructions in non-persistent memory 120 typically do not survive after the user device 102 has been turned off or power to the non-persistent memory 120 has otherwise been interrupted. The persistent storage 130 may store data and instructions on a longer-term basis than non-persistent memory 120, even when power is interrupted to the persistent storage 130. For example, the persistent storage 130 may store executable program files and data for the operating system 122 and various applications and services, including a persistent version of the browser state file 152 that corresponds to the browser state file 150 in non-persistent memory 120. The persistent storage 130 is typically slower than non-persistent memory 120, and therefore the executable program files and data in persistent storage 130 are loaded into non-persistent memory 120 for access/execution by the processor 140.

The content servers 104 can correspond to logical associations of one or more computing devices for hosting content and servicing requests for the hosted content over the network 110. For example, a content server 104 can include a web server component corresponding to one or more server computing devices for obtaining and processing requests for content (such as content pages) from client devices 102, intermediary systems 106, or other devices or service providers. In some embodiments, one or more content servers 104 may be associated with one or more CDN service providers (e.g., entities that manage multiple CDN servers), application service providers, etc.

The intermediary system 106 can correspond to logical associations of one or more computing devices for retrieving content over the network 110 on behalf of client devices 102. For example, the intermediary system 106 may be a proxy server that receives requests from a client device 102 for content hosted by a particular content server 104. The intermediary system 106 can retrieve the content from a local content cache 160 or from the content server 104, and provide the requested content to the client device 102. In some embodiments, the intermediary system 106 can include a server-side browser application 162 or other server-side content processing component. The server-side browsing application can perform processing actions on a requested content item prior to providing a response to the request from the client device 102. For example, web pages may be processed by a plurality of processing actions to render the web pages for display. The server-side browser 162 may be configured to perform some or all of the processing actions and return a partially or completely rendered version of the page to the client device 102. One example of an intermediary system with a server-side browser application is disclosed in commonly-owned U.S. Pat. No. 8,706,860, issued on Apr. 22, 2014, and entitled "Remote Browsing Session Management," the contents of which are incorporated by reference herein in their entirety.

Figure 2:
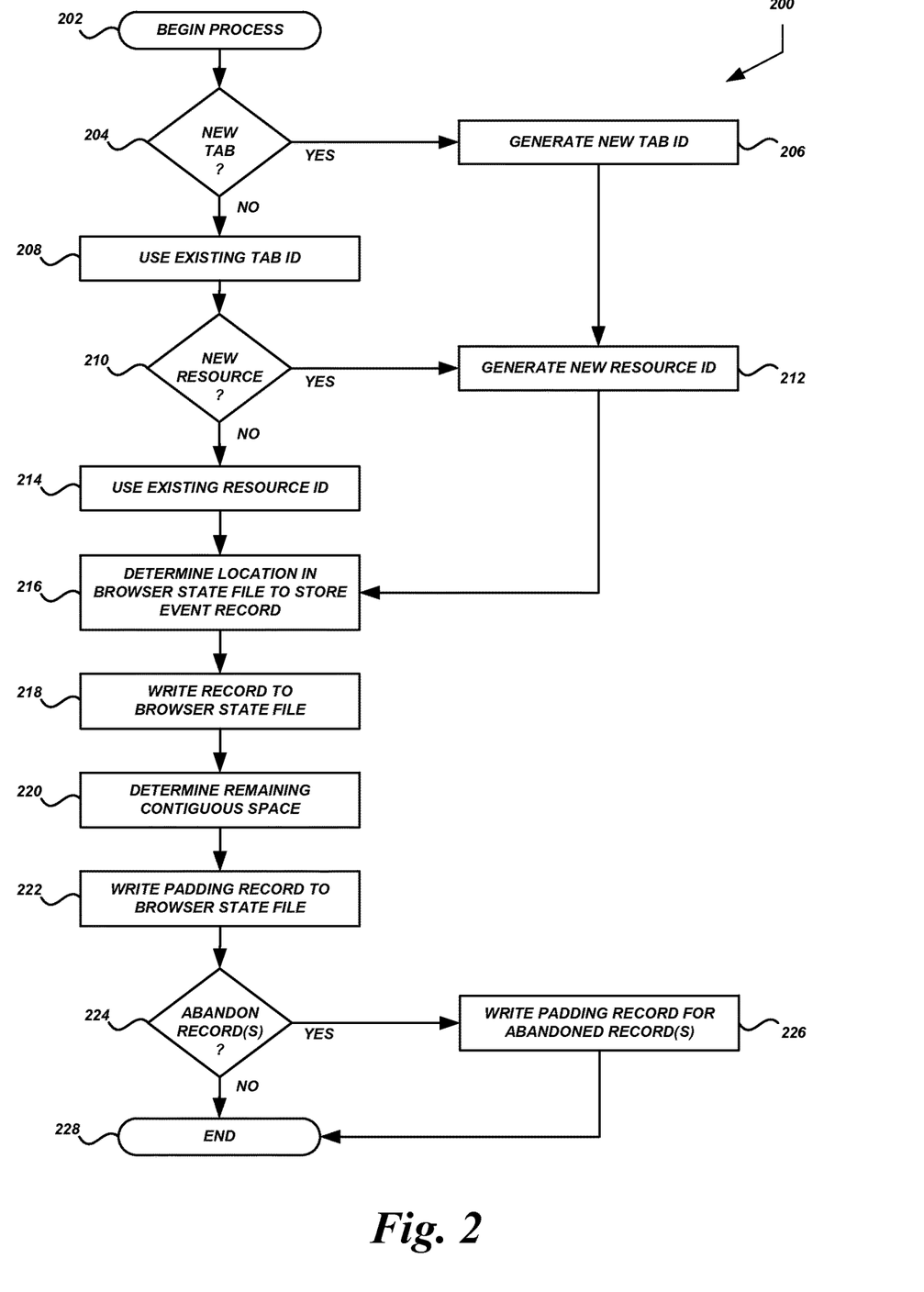
FIG. 2 is a flow diagram of an illustrative process for managing the storage and updating of browser state information according to some embodiments.

FIG. 2 is a flow diagram of a process 200 for managing the storage and updating of browser state information. Advantageously, a browser 124 executing on a client device 102 may use a memory-mapped browser state file 150 to efficiently store navigation history and other browser state information without requiring the use of a database management engine. Although process 200 is described with respect to storing, updating, removing, and/or overwriting information regarding the navigation history of various browser windows, some or all of the process 200 may be used in response to other events. For example, the browser 124 may store information about settings that are not directly tied to a particular window or resource.

FIGS. 3, 4, 5, and 6 ("FIGS. 3-6") illustrate a browser interface 300 at various points in time during a browsing session, and the browser state file 150 at each of the corresponding points in time. The process 200 will be described with respect to storing and updating the browser state at each of the points in time illustrated in FIGS. 3-6.

Figure 3:
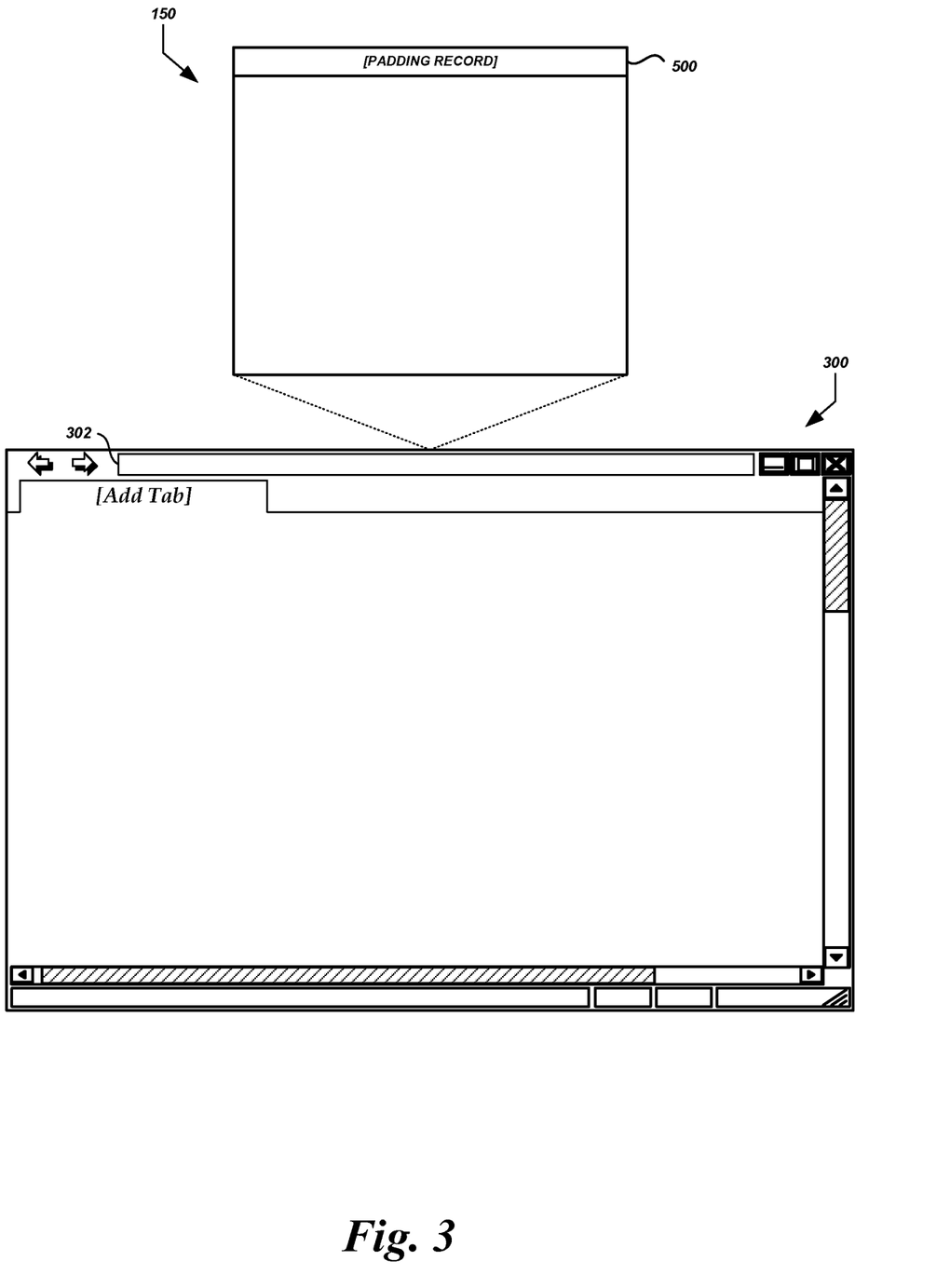
FIG. 3 shows an illustrative browser interface and a corresponding new browser state file according to some embodiments.

FIG. 3 shows an illustrative browser interface 300 and a corresponding new browser state file 150, such as a browser state file for a browser the first time the browser application is used, upon initiation of a new browsing session, or after the browser state file has been cleared. The new browser state file 150 includes only a padding record 500, at the beginning of the file, indicating that the rest of the browser state file 150 is available for new records.

Figure 4:
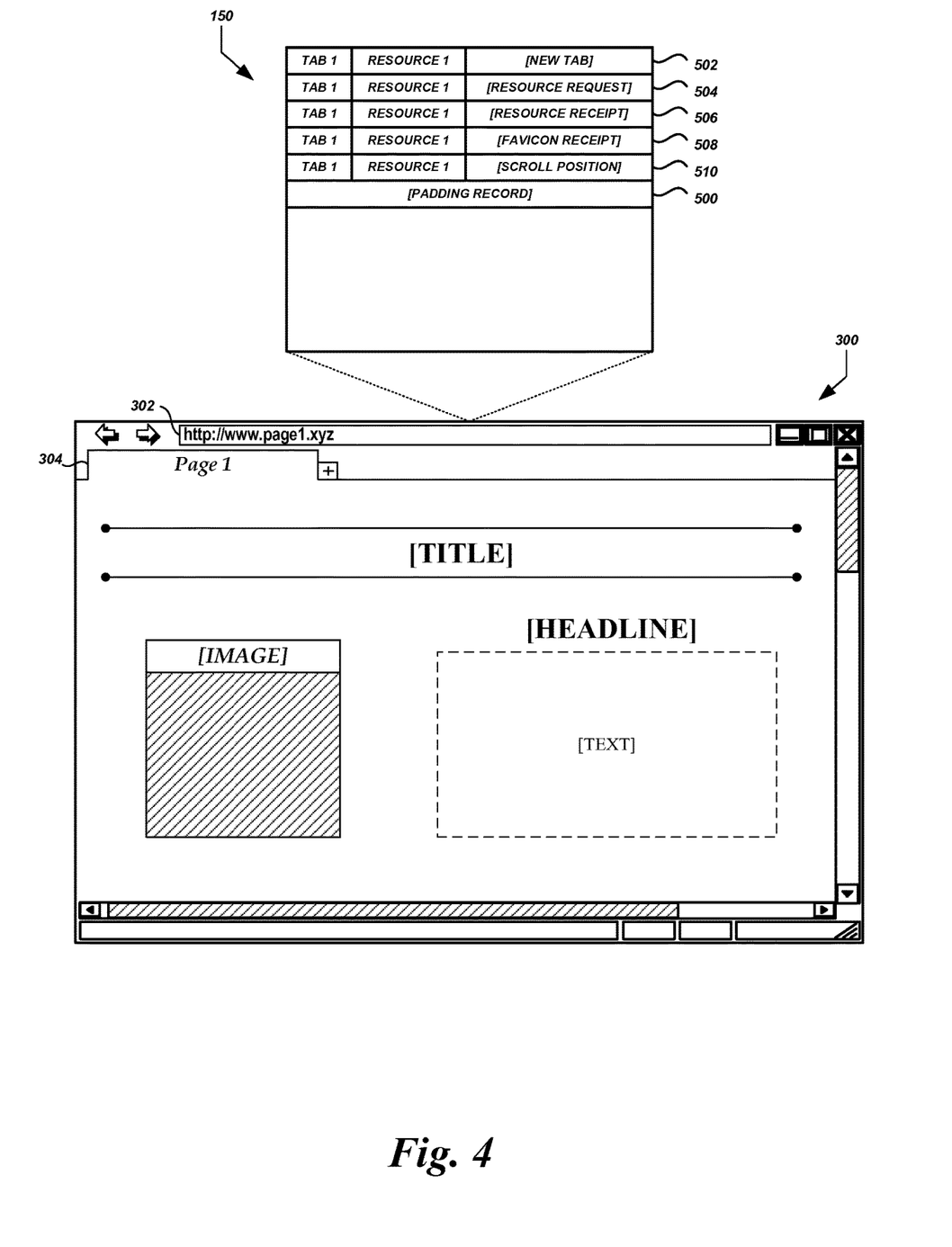
FIG. 4 shows an illustrative browser interface and a corresponding browser state file storing history information for one window according to some embodiments.

FIG. 4 shows the browser interface 300 and corresponding browser state file 150 after a tab 304 has been opened and a network resource has been retrieved. The browser state file 150 includes multiple records reflecting the events that have occurred and the current state of the browser, as described in greater detail below.

Figure 5:
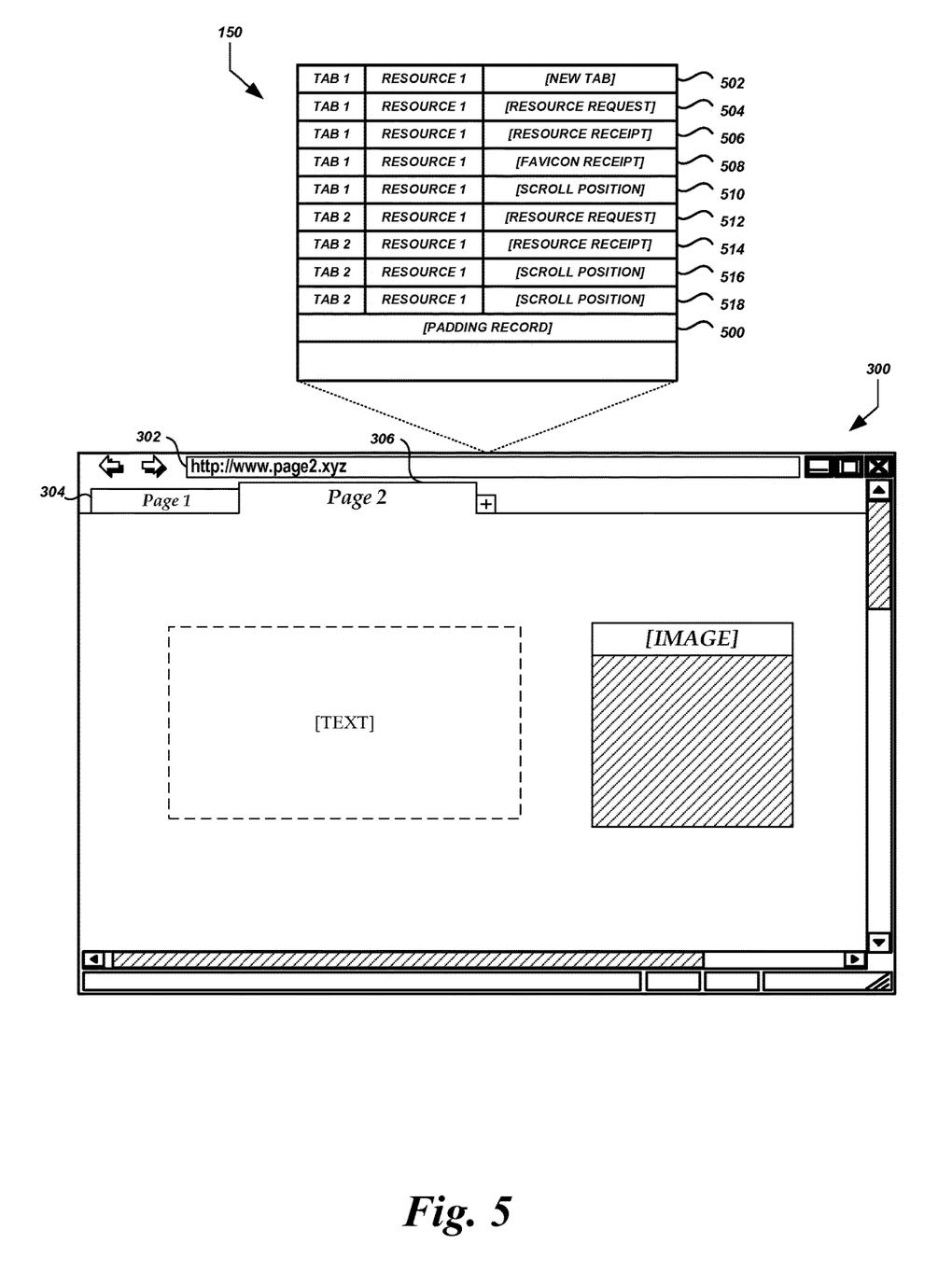
FIG. 5 shows an illustrative browser interface and a corresponding browser state file storing history information for multiple windows according to some embodiments.

FIG. 5 shows the browser interface 300 and corresponding browser state file 150 after a second tab 306 has been opened and a second network resource has been retrieved. The browser state file 150 includes multiple records reflecting the additional events that have occurred and the updated state of the browser, as described in greater detail below.

Figure 6:
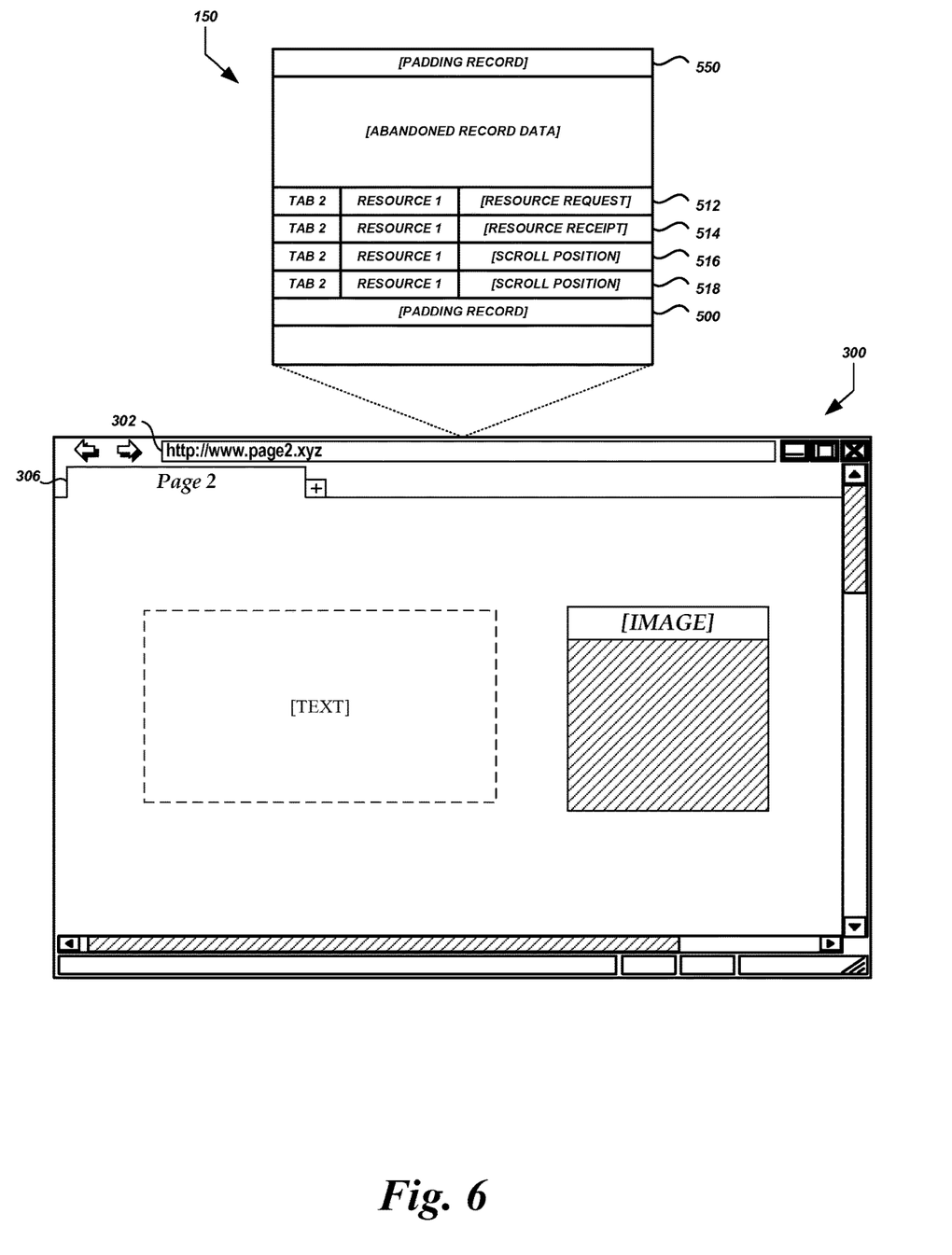
FIG. 6 shows an illustrative browser interface and a corresponding browser state file storing history information for an open window and a closed window according to some embodiments.

FIG. 6 shows the browser interface 300 and corresponding browser state file 150 after the first tab 304 has been closed. The browser state file 150 includes records reflecting the closing of the tab 304, the abandonment of records associated with the previous state of the tab 304, and the availability of the space previously taken by the abandoned records.

With reference now to FIG. 2, the process 200 begins at block 202. The process 200 may begin when a browser 124 is instantiated on a client device 102, when a new event occurs triggering the creation of a new browser state record, or in response to detection of some other event causing a change in the state of the browser 124. The process 200 may be embodied in a set of executable program instructions stored on one or more non-transitory computer-readable media, such as persistent storage 130 of the client device 102. When the process 200 is initiated, the executable program instructions can be loaded into non-persistent memory 120, such as RAM, and executed by one or more processors 140 of the client device 102. In some embodiments, the client device 102 may include multiple individual processors 140, and the process 200 or portions thereof may be executed by separate processors 140 serially or in parallel.

At decision block 204, the browser 124 can determine whether a new tab or other browser window has been created. If a new tab has been created (e.g., a new browsing session is being started, a user has manually created a new tab, content in an existing tab has caused a new tab to be opened to display "popped up" content, etc.), the process 200 proceeds to block 206 where a new tab identifier is created. Otherwise, if a new tab has not been created, the process 200 may proceed to block 208 where an existing tab identifier is used to store one or more records regarding the browser state change that initiated execution of the process 200.

At block 206, the browser 124 may create a new identifier for the tab. Illustratively, the browser 124 may create the identifier by incrementing (e.g., adding a predetermined constant value, such as 1) to the last identifier that the browser created. The identifier, which can be referred to as a tab identifier or window identifier, may be used for storing records regarding the navigation history and other state changes associated with the tab. As shown in FIG. 3, a new browse session has been started and a new browser interface 300 has been displayed. As shown in FIG. 4, the browser 124 may automatically open a new tab 304 or a user may open a new tab 304 and request a network resource. In response to the opening of the browser tab 304, the browser 124 can assign a new tab identifier, such as "1." As shown in FIG. 5, a second new tab 306 has been created. The new tab 306 may have been created after the occurrence of various browsing actions and the storage of various records in the browser state file 150, as described in greater detail below. In response to the opening of the second new browser tab 306, the browser 124 can assign an incremental new tab identifier, such as "2."

At decision block 210, the browser 124 can determine whether a new network resource has been requested. If a new network resource has been requested, the process 200 proceeds to block 212 where a new resource identifier is created. Otherwise, if a new network resource has not been requested, the process 200 may proceed to block 214 where an existing resource identifier is used to store one or more records regarding the browser state change that initiated execution of the process 200.

At block 212, the browser 124 may create a new identifier for the network resource. Illustratively, the browser 124 may create the identifier by incrementing (e.g., adding a predetermined constant value, such as 1) to the last identifier that the browser created for a network resource to be displayed in the current tab. The identifier, which can be referred to as a resource identifier, may be used for storing records regarding the retrieval, processing, and display of the network resource and other state changes associated with the network resource. As shown in FIG. 4, a new network resource has been requested, indicated by the "page1.xyz" URL in the address bar 302. In response to the request for the new network resource, the browser 124 can assign a new network resource identifier, such as "1." As shown in FIG. 5, a second new network resource has been requested, indicated by the "page2.xyz" URL in the address bar 302. In response to the request for the second new network resource, the browser 124 can assign another new incremental network resource identifier, such as "2."

At block 216, the browser 124 can determine a location in the browser state file 150 at which to store records regarding a change in the browser state. Illustratively, the browser 124 can inspect the last record in the browser state file 150 to see if the record is a padding record indicating the availability of space for storage of new records. As shown in FIG. 3, an availability record or padding record 500 in the new browser state file 150 is the only record in the file. The padding record 500 indicates that the remainder of the file, through the end of the file, is available for storage of new records. If browser state records have already been stored in the browser state file 150, the padding record 500 will not be the only record. For example, FIGS. 4, 5, and 6 show the browser state file 150 with browser state records in addition to the padding record 500. In some cases, there may be no available space at the end of the file, or the amount of space available at the end of the file, as indicated by the padding record, may not be large enough for the record to be written (e.g., when the record includes a thumbnail image of the currently-displayed resource, and the amount of space remaining at the end of the file is small). In such cases, the browser can inspect the file 150 for available space indicated by padding records interspersed between existing browser state records. In some embodiments, the browser 124 may use a dictionary, index, or other listing of available spaces in the 150, rather than inspecting the file 150 for available spaces.

In some embodiments, the browser 124 can select a location in the browser state file 150 such that writing records to the file 150 will affect the smallest number of memory pages. Operating systems often use memory pages (also referred to simply as "pages") to manage the reading and writing of information to and from persistent storage. In a typical implementation, an operating system handles the reading and writing of data to and from persistent storage on a page-by-page basis, where each page is the same size (e.g., each page is 4 kilobytes or KB, each page is 32 KB, etc.). Thus, when the operating system is going to write data to persistent storage, it will write the entire page that includes changed data to persistent storage. For example, a particular device uses a page size of 4 KB, and 1 KB of data in a particular page has changed as is to be written to persistent storage. The operating system will write the entire 4 KB page that includes the 1 KB of data that has changed, even if there is no change to the other 3 KB of data in the page. If the data that has changed is spread across multiple pages, then each of the pages is written to persistent storage in their entireties. Returning to the previous example, if the 1 KB of data that has changed is spread across two 4 KB pages, then both pages are written to persistent storage, even though 7 out of 8 KB of total data in the two pages has not changed. In order to minimize the number of pages affected by the writing of individual records or groups of records to the memory state file 150, the browser 124 can determine the size of the records to be written, and the memory offset of possible locations at which to write the record(s). If writing the record(s) at a particular offset will cross a page boundary (e.g., if a 1 KB record is to be written, but the offset of a location is only 0.5 KB from a page boundary), then the browser 124 can select a different location such that the record(s) can be written without crossing any page boundary, or crossing the smallest number of page boundaries, etc.

In the example shown in FIG. 3, upon receiving a request for a new network resource, the browser 124 can inspect the padding record 500 in the browser state file 150 and determine that there is enough available space in the browser state file 150, beginning at the location of the padding record 500, to begin storing records regarding the network resource request.

At block 218 of FIG. 2, the browser 124 can write one or more records to the browser state file 150 beginning at the location determined above at block 216. The records can include the tab and resource identifiers determined above, and information regarding the nature of the change to the state of the browser. The records may add new information regarding the state of the browser 124, indicate out-of-date information regarding the state of the browser 124, replace previous records regarding the state of the browser 124, or the like.

In some embodiments, a new record may be added to update or replace a previously-saved record regarding a particular property of the browser state, without deleting or overwriting the previous record. As shown in FIG. 5, two records 516 and 518 may be added regarding the scroll position for a particular resource (resource 1) shown in a particular tab (tab 1). The first scroll position record 516 may be added to save a current scroll position after a user initially scrolls the display of the resource. Later, the user may scroll to a different position in the display of the resource. A new record 518 may be added to the browser state file 150 to save the updated scroll position. As shown, the new record 518 may be added to the browser state file 150 without deleting or overwriting the previous record 516. When the browser 124 uses the browser state file 150 to recreate the browser state, both records 516 and 518 may be read. However, the browser 124 may only use the last record for a given property of browser state (e.g., the scroll position for resource 1 in tab 2), or the browser 124 may update the browser state using multiple records such that the last-written record is used to update the browser state after any prior records regarding the same browser state property are used to update the browser state. For example, records may be stored with timestamps or other sequential identifiers that can be used to determine an order in which the records were written to the browser state file 150. Such sequential identifiers can be useful when, e.g., a later-written record is written to a location in the browser state file 150 that precedes the location of an earlier-written record, even though the earlier-written record has been superseded by the later-written record.

In some embodiments, a temporary record may be added to the browser state file 150 indicating that a record (or group of records) with a size exceeding some predetermined or dynamically determined threshold is to be written to file 150. Then, once the large record or group of records is successfully written to the file 150, the temporary record may be abandoned. For example, if a thumbnail image of a resource is to be written to the browser state file 150, the operation may take significantly longer than writing a record indicating the thumbnail is to be written. In such cases, a record indicating that the larger record or group of records is pending may be written to the file 150 first. In some embodiments, records added to the browser state file 150 may include a flag indicating whether the record is a replacement for, or supplement to, a previously-stored record (e.g., a record with the same tab and resource identifiers, and regarding the same action causing a change to a browser state property). In some embodiments, the records may include a flag indicating whether the action that is the subject of the record is complete. For example, when the record being written relates to a resource request, a flag may be set initially to indicate that a response has not yet been received. Later, after a response is received, the record may be updated to set the flag to a state indicating that the response has been received. Alternatively, a new record may be written that is the same as the previously-written request record in many respects. However, in the new record the flag may be set to a state indicating that the response has been received. Thus, when the browser 124 later reads in the browser state file 150 (e.g., after a crash, at the beginning of a subsequent browsing session, etc.), the browser 124 will be able to determine, e.g., whether a response was ever received for the request. This can be useful when the browser 124 is being re-started after a crash. The browser 124 may determine that the incomplete action, as indicated by the flag, may be responsible or at least partially associated with the crash. The browser 124 can then suppress re-execution of the incomplete action (e.g., not re-request the requested resource) when re-creating the state of the browsing session. In some embodiments, the browser 124 may prompt the user to decide whether to re-execute the incomplete action. In this way, the browser 124 can potentially avoid a repeating loop of browsing session re-creations and subsequent browser crashes.

With reference to FIG. 4, when a new tab 304 is opened and a new resource is requested, new records may be written into the file 150 at the location determined above at block 216. For example, a record 502 may be written regarding the creation of the new tab 304. Another record 504 may be written regarding the request for the network resource. Yet another record 506 may be written when, subsequently, the requested network resource is received. As shown, the records 504 and 506 regarding the request and receipt of the network resource may both have the same tab and resource identifiers. In this example, record 506 regarding the receipt of the network resource supplements the information previously stored in record 504 regarding the request for the network resource. Subsequent records regarding the network resource may also be added during subsequent executions of the process 200, such as receipt of a favicon 508, information regarding scrolling position 510, etc. These additional records may also have the same tab and resource identifiers.

At block 220, the browser 124 can determine the remaining contiguous available space after the record written above at block 218. The remaining contiguous available space may be space between the record written at block 218 and the end of the file, or between the record written at block 218 and the next valid record in the file. In the example shown in FIG. 4, the space between the last written record 510 and the end of the file may be available, and therefore the browser 124 may calculate the amount of such available space.

At block 222, the browser 124 can write a padding record 500 to the browser state file 150, indicating the amount of available space determined above at block 220. In the example shown in FIG. 4, the padding record 500 is written as the last record in the file 150. However, in some cases, the padding record 500 may be written between records, such as when records have been abandoned due to, e.g., the close of a browser tab. The browser 124 can also store information about the location at which the padding record 500 was written, such as a pointer to the location in persistent memory 120. The browser 124 can then use the pointer to the padding record 500 when writing the next record, such as during the next execution of the process 200. In this way, the browser 124 may not need to re-execute some or all of the operations described above with respect to block 216 to determine the location at which to write the next record. In addition, by sequentially writing records to the browser state file 150 regarding events occurring sequentially, fragmentation of the browser state file 150 may be reduced and the likelihood of writing multiple records at once to persistent storage 130 may be increased. In some embodiments, the browser 124 can store information about the location at which the current record was written above at block 218 (or the next contiguous location) instead of the location at which the padding record 500 was written.

At decision block 224, the browser 124 can determine whether to abandon previously-stored records based on the event that triggered the writing of the current record at block 218. For example, if a tab has been closed, or a user has performed a "back" navigation event, then some records are no longer needed to define the current state of the browser and may be abandoned. If records are to be abandoned, the process 200 can proceed to block 226, where padding records are added to indicate the availably of the space(s) currently taken by the abandoned record(s). Otherwise, if no records are to be abandoned, the process can terminate at block 228.

In the present examples shown in FIGS. 3, 4, and 5, no records are to be abandoned, so the process 200 can terminate at block 228. However, in the example shown in FIG. 6, a tab 304 has been closed and the records 502-510 corresponding to the closed tab 304 may now be abandoned. In abandoning the records 502-510, the browser 124 can write a padding record 550 at the spot of the first record 502 to be abandoned. The padding record 550 can indicate that the portion of the file 150 from the padding record 550 to the last record 510 to be abandoned is available for new records. However, the browser 124 may not erase or overwrite all abandoned records; instead, their locations are merely indicated as available in the padding record, index of available locations, etc.

Illustratively, the padding record 550 may indicate a number of contiguous available bytes, a number of contiguous available record slots (if records all take up the same amount of space), etc. In some cases, records for the tab 304 may not all be in a single region, but may be separated by records for other tabs. For example, if a user navigated to an additional resource in the first tab 304 subsequent to performing the operations in the second tab 306 recorded in records 512 and 514, but prior to closing the first tab 304, then the records associated with the navigation to the additional resource in the first tab 304 may have been written in a location in the file 150 that occurs after the records 512 and 514 associated with the second tab 306. Nevertheless, those records associated with the additional resource would be abandoned after closing the first tab 306. In this situation, an additional padding record would be written at the beginning of each region of the file 150 that includes abandoned records. Thus, a browser state file 150 may include many different padding records, particularly if the browser state file 150 is highly fragmented.

In some embodiments, an abandonment record may be written instead of, or in addition to, a padding record in certain cases. The abandonment record may indicate that a certain record or group of records is abandoned. The abandonment record may be added to the browser state file 150 to record the abandonment of records while the browser 124 determines and generates the padding record described above to indicate that space associated with the abandoned records is available for new records. By using an explicit abandonment record, the browser 124 can ensure that information has been stored regarding which records have been abandoned. Such records may therefore be ignored during restoration of the browser state and overwritten when new records are to be written, even if the browser crashes before the padding record can be written (or the padding record is otherwise not written). Returning to the example described above with respect to FIG. 6, an abandonment record indicating that tab 1 has been closed may be written to the browser state file 150. Then, even though the browser 124 has not completely identified and written padding records for the locations in the file 150 at which records for tab 1 have been written, the browser 124 can ensure that the abandonment of records associated with tab 1 has been recorded.

In some embodiments, the browser 124 may defragment a fragmented browser state file 150 in order to consolidate the free space into a smaller number of regions (e.g., 1 region at the end of the file). For example the browser 124 may use a greedy algorithm to defragment the file 150.

In some embodiments, the client device 102 may retrieve content via an intermediary system 106, instead of or in addition to retrieving content directly from content servers 104. For example, the intermediary system 106 may serve as a caching proxy server. As another example, the intermediary system 106 may have a server-side browser 162 that processes content separately from, or in conjunction with, the client-side browser 124 executing on the client device 102. The server-side browser 162 can mirror the browsing session on the client device 102, including the maintenance of a browser state file. Thus, the client device 102 can have a backup of the browser state file stored remotely at the intermediary system 106. In some embodiments, the user of the client device 102 may later use a different client device, connect to the intermediary system 106, and obtain the browser state file previously generated in connection with the browsing session on the first client device 102. Thus, the user may have the previous browsing session re-created on a different client device, including all navigation history, scrolling positions, and other characteristics of the browser session for which records were stored in the browser state file.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   non-transitory non-persistent memory;
   non-transitory persistent storage; and
   one or more computing devices configured by an executable browser application to at least:
   reserve a region of the non-persistent memory for a browser state file mapped to a corresponding file stored in the persistent storage;
   display a browser interface comprising a plurality of tabbed display windows, wherein individual tabbed display windows correspond to individual web pages;
   detect occurrence of a first event associated with a tabbed display window of the plurality of tabbed display windows, wherein the first event comprises a navigation operation causing a change in a multi-tab browsing session state of the browser application, wherein the multi-tab browsing session state comprises navigation history information regarding the plurality of tabbed display windows;
   determine, using an index of available storage locations in the browser state file, a location in the browser state file at which a record regarding a prior event is stored, wherein the location in the browser state file is determined based at least partly on the record regarding the prior event being abandoned, and wherein the record regarding the prior event being abandoned comprises the record regarding the prior event no longer being needed to restore the multi-tab browsing session state;
   store a record of the first event at the location in the browser state file, the record of the first event comprising an identifier of the tabbed display window and an identifier of a web page displayed in the tabbed display window during occurrence of the first event, wherein the record of the first event is written to the corresponding file in persistent storage without the browser application issuing a command to write the record of the first event to the corresponding file in persistent storage;
   detect occurrence of a second event causing the tabbed display window to be closed; and
   update the index of available storage locations to indicate that the location is available for storing records.

2. The system of claim 1, wherein the one or more computing devices are further configured to at least store a second record at the location in the browser state file indicating that a contiguous region of the browser state file, beginning at the location and ending at a second location in the browser state file immediately preceding a record regarding a different event, is available for storing records.

3. The system of claim 1, wherein the one or more computing devices are further configured to at least store a record of a subsequent event at the location in the browser state file based at least partly on the index indicating that the location is available for storing records.

4. The system of claim 1, wherein the one or more computing devices are further configured to at least:
    remove the browser state file from non-persistent memory; and
    subsequently:
        reload the browser state file from persistent storage into non-persistent memory; and
        recreate the multi-tab browsing session state, using the reloaded browser state file, to a state corresponding to a time at which the second event was detected.

5. The system of claim 1, wherein the navigation history information represents a plurality of navigation operations performed by the browser, and wherein a navigation operation of the plurality of navigation operations comprises retrieving and displaying a requested web page in place of a currently-displayed web page.

6. A computer-implemented method comprising:
    as implemented by one or more computing devices configured to execute specific instructions,
        maintaining, by a browser application executing on the one or more computing devices, a browser state file in non-persistent memory of the one or more computing devices, the browser state file mapped to a corresponding file stored in persistent storage of the one or more computing devices, wherein the browser state file comprises a plurality of records regarding changes to a browsing session state of the browser application during a current browsing session, and wherein the browsing session state comprises navigation history information regarding the current browsing session;
        determining one or more locations in the browser state file at which records regarding prior navigation events are stored, wherein the one or more locations are determined based at least partly on the records regarding the prior navigation events being abandoned, wherein the records regarding the prior navigation events being abandoned comprises the records regarding prior navigation events no longer being needed to restore the browsing session state of the browser application;
        adding, by the browser application, new records to the browser state file, the new records comprising information regarding newly detected navigation events changing the browsing session state of the browser application to an updated browsing session state, wherein at least a portion of the new records are added at the one or more locations in the browser state file at which records regarding prior navigation events are stored; and
        writing, by an operating system of the one or more computing devices, the new records to the corresponding file stored in the persistent storage, wherein the operating system automatically updates the corresponding file stored in the persistent storage to reflect modifications to the browser state file without the browser application issuing a command to update the corresponding file stored in the persistent storage.

7. The computer-implemented method of claim 6 further comprising providing, by the operating system to the browser application, the new records from the corresponding file stored in the persistent storage in response to the browser application being instantiated subsequent to writing the new records to the corresponding file stored in the persistent storage.

8. The computer-implemented method of claim 7, further comprising restoring, by the browser application, the browsing session state of the browser application using the new records provided by the operating system.

9. The computer-implemented method of claim 6 further comprising:
    determining an incremental window identifier for a browser window affected by a newly detected navigation event; and
    determining an incremental resource identifier for a network resource associated with the browser window and affected by the newly detected navigation event,
    wherein at least one of the new records added to the browser state file comprises the incremental window identifier, the incremental resource identifier, and information regarding the newly detected navigation event usable to restore the updated browsing session state of the browser application.

10. The computer-implemented method of claim 6 further comprising abandoning the records regarding the prior navigation events by updating an index of available locations in the browser state file to indicate that the one or more locations, at which the records regarding the prior navigation events are stored, are available.

11. The computer-implemented method of claim 6 further comprising abandoning the records regarding the prior navigation events by storing an availability record at a selected location in the browser state file at which at least one record of the one or more records regarding the prior navigation events was stored, wherein the availability record indicates that a region of the browser state file is available, and wherein the region begins at the selected location.

12. The computer-implemented method of claim 6, wherein at least one of the newly detected navigation events comprises at least one of: requesting a network resource from a network-accessible content server; receiving a network resource from a network-accessible content server; obtaining a thumbnail image of a network resource; obtaining a resource icon associated with a requested network resource; obtaining optimization information regarding processing a network resource; obtaining a processing hint regarding a location of an element in a display of a network resource; receiving a communication header from a network-accessible content server; generating a performance metric associated with processing a request for a network resource; or determining an address of an intermediary system from which to request network resources.

13. The computer-implemented method of claim 6 further comprising selecting a selected location in the browser state file for writing at least one of the new records such that writing the at least one of the new records at the selected location will affect a minimum number of memory pages.

14. Non-transitory computer storage storing a computer-executable browser application, wherein the computer-executable browser application is configured to cause a computing device to perform a process comprising:
    maintaining, in non-persistent memory of the computing device, a browser state file mapped to a corresponding file stored in persistent storage of the computing device, wherein the browser state file comprises a plurality of records regarding changes to a browsing session state of the browser application during a current browsing session, wherein the browsing session state comprises navigation history information regarding the current browsing session, and wherein an operating system of the computing device updates the file stored in the persistent storage to reflect changes to the browser state file without requiring the browser application to initiate updating of the file stored in the persistent storage;

determining one or more locations in the browser state file at which records regarding prior events are stored, wherein the one or more locations are determined based at least partly on the records regarding the prior events being abandoned, wherein the records regarding the prior events being abandoned comprises the records regarding the prior events no longer being needed to restore the browsing session state of the browser application;

adding, to the browser state file, new records regarding newly detected events changing the browsing session state to an updated browsing session state, wherein at least a portion of the new records are added at the one or more locations in the browser state file at which records regarding prior events are stored; and responsive to instantiating the browser application subsequent to adding the new records to the browser state file, restoring the updated browsing session state using the browser state file.

15. The non-transitory computer storage of claim 14, wherein the process further comprises:

determining an incremental window identifier for a browser window affected by a newly detected event; and determining an incremental resource identifier for a network resource associated with the browser window and affected by the newly detected event, wherein at least one of the new records added to the browser state file comprises the incremental window identifier, the incremental resource identifier, and information regarding the newly detected event usable to restore the updated browsing session state of the browser application.

16. The non-transitory computer storage of claim 15, wherein restoring the updated browsing session state comprises applying changes to a default browsing session state of the browser application in sequential order using the incremental window identifier and the incremental resource identifier.

17. The non-transitory computer storage of claim 14, wherein the process further comprises abandoning the records regarding the prior events by storing an availability record at a selected location in the browser state file at which at least one record of the one or more records regarding prior events was stored, wherein the availability record indicates that a region of the browser state file is available, and wherein the region begins at the selected location.

18. The non-transitory computer storage of claim 14, wherein at least one of the newly detected events comprises at least one of: requesting a network resource from a network-accessible content server; receiving a network resource from a network-accessible content server; obtaining a thumbnail image of a network resource; obtaining a resource icon associated with a requested network resource; scrolling a display of a network resource initiated by a user of the browser application; obtaining optimization information regarding processing a network resource; receiving a communication header from a network-accessible content server; setting a cookie associated with a network resource; generating a performance metric associated with processing a request for a network resource; or determining an address of an intermediary system from which to request network resources.

19. The non-transitory computer storage of claim 14, wherein the process further comprises selecting a selected location in the browser state file for writing at least one of the new records such that writing the at least one of the new records at the selected location will affect a minimum number of memory pages.

20. The non-transitory computer storage of claim 14, wherein the process further comprises receiving, from a network-accessible intermediary system, a second browser state file from which a browsing session state generated on a second computing device may be restored on the computing device.

21. The non-transitory computer storage of claim 14, wherein the process further comprises:

determining that a new record to be written to the browser state file exceeds a size threshold;

writing a temporary record to the browser state file, the temporary record indicating that the new record is to be written to the browser state file; and responsive to determining that the new record was successfully written to the browser state file, abandoning the temporary record.

* * * * *

UNITED STATES PATENT AND TRADEMARK OFFICE
CERTIFICATE OF CORRECTION

PATENT NO.         : 10,691,750 B1
APPLICATION NO.    : 14/867670
DATED              : June 23, 2020
INVENTOR(S)        : Jari Juhani Karppanen It is certified that error appears in the above-identified patent and that said Letters Patent is hereby corrected as shown below:

In the Claims

In Column 18, Line 5, Claim 8, delete "the" (2nd occurrence) and insert --the updated--.

Signed and Sealed this
Fifteenth Day of September, 2020

Andrei Iancu
*Director of the United States Patent and Trademark Office*